(12) United States Patent
Ichihara et al.

(10) Patent No.: US 12,526,530 B2
(45) Date of Patent: Jan. 13, 2026

(54) ILLUMINATION APPARATUS AND ITS CONTROL METHOD

(71) Applicant: CANON KABUSHIKI KAISHA, Tokyo (JP)

(72) Inventors: Yoshiro Ichihara, Kanagawa (JP); Tatsuo Takatori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 157 days.

(21) Appl. No.: 18/488,173

(22) Filed: Oct. 17, 2023

(65) Prior Publication Data

US 2024/0137655 A1 Apr. 25, 2024
US 2024/0236499 A9 Jul. 11, 2024

(30) Foreign Application Priority Data

Oct. 21, 2022 (JP) .................. 2022-169301

(51) Int. Cl.
*H04N 23/74* (2023.01)
*H04N 23/617* (2023.01)
*H04N 23/71* (2023.01)

(52) U.S. Cl.
CPC ........... *H04N 23/74* (2023.01); *H04N 23/617* (2023.01); *H04N 23/71* (2023.01)

(58) Field of Classification Search
CPC ...... H04N 23/74; H04N 23/617; H04N 23/71; H04N 23/56; H04N 23/50
See application file for complete search history.

(56) References Cited

U.S. PATENT DOCUMENTS

2023/0164445 A1\* 5/2023 van Voorst Vader .. H04N 23/74
348/370

FOREIGN PATENT DOCUMENTS

JP 2006-064763 A 3/2006

\* cited by examiner

*Primary Examiner* — Ahmed A Berhan
(74) *Attorney, Agent, or Firm* — Cowan, Liebowitz & Latman, P.C.

(57) ABSTRACT

An illumination apparatus is communicatively connected to an image pickup apparatus and configured to emit illumination light. The illumination apparatus performs light emission control of the illumination light under the custom light emitting condition by reading the custom light emitting condition corresponding to a custom imaging condition from the memory in a case where imaging under the custom imaging condition set by the user is selected in the image pickup apparatus.

8 Claims, 13 Drawing Sheets

ILLUMINATION APPARATUS AND ITS CONTROL METHOD

BACKGROUND

Technical Field

One of the aspects of the embodiments relates to an illumination apparatus configured to illuminate an object with illumination light.

Description of Related Art

Some imaging systems include an image pickup apparatus such as a digital camera and an illumination apparatus such as a strobe and allow the user to make a custom setting of a light emitting condition of the illumination apparatus.

Japanese Patent Laid-Open No. 2006-64763 discloses an imaging system that includes an image pickup apparatus that sets an imaging mode for a dedicated strobe when determining that an illumination apparatus attached to the image pickup apparatus is a dedicated communicable strobe.

However, in the configuration where the user makes the custom setting of the illumination apparatus on the illumination apparatus and stores it in the illumination apparatus, the user may not be able to easily make the custom setting of the illumination apparatus just before imaging using the image pickup apparatus, or make a mistake in the custom setting.

SUMMARY

An illumination apparatus is communicatively connected to an image pickup apparatus and configured to emit illumination light. The illumination apparatus includes a memory storing a custom light emitting condition set by a user, and a processor configured to perform light emission control of the illumination light under the custom light emitting condition by reading the custom light emitting condition corresponding to a custom imaging condition from the memory in a case where imaging under the custom imaging condition set by the user is selected in the image pickup apparatus. An imaging system including the above illumination apparatus also constitutes another aspect of the embodiment. A control method of the above illumination apparatus also constitutes another aspect of the embodiment. A storage medium storing a program that causes a computer to execute the above control method also constitutes another aspect of the embodiment.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a description will be given of embodiments according to the disclosure.

First Embodiment

Figure 2:
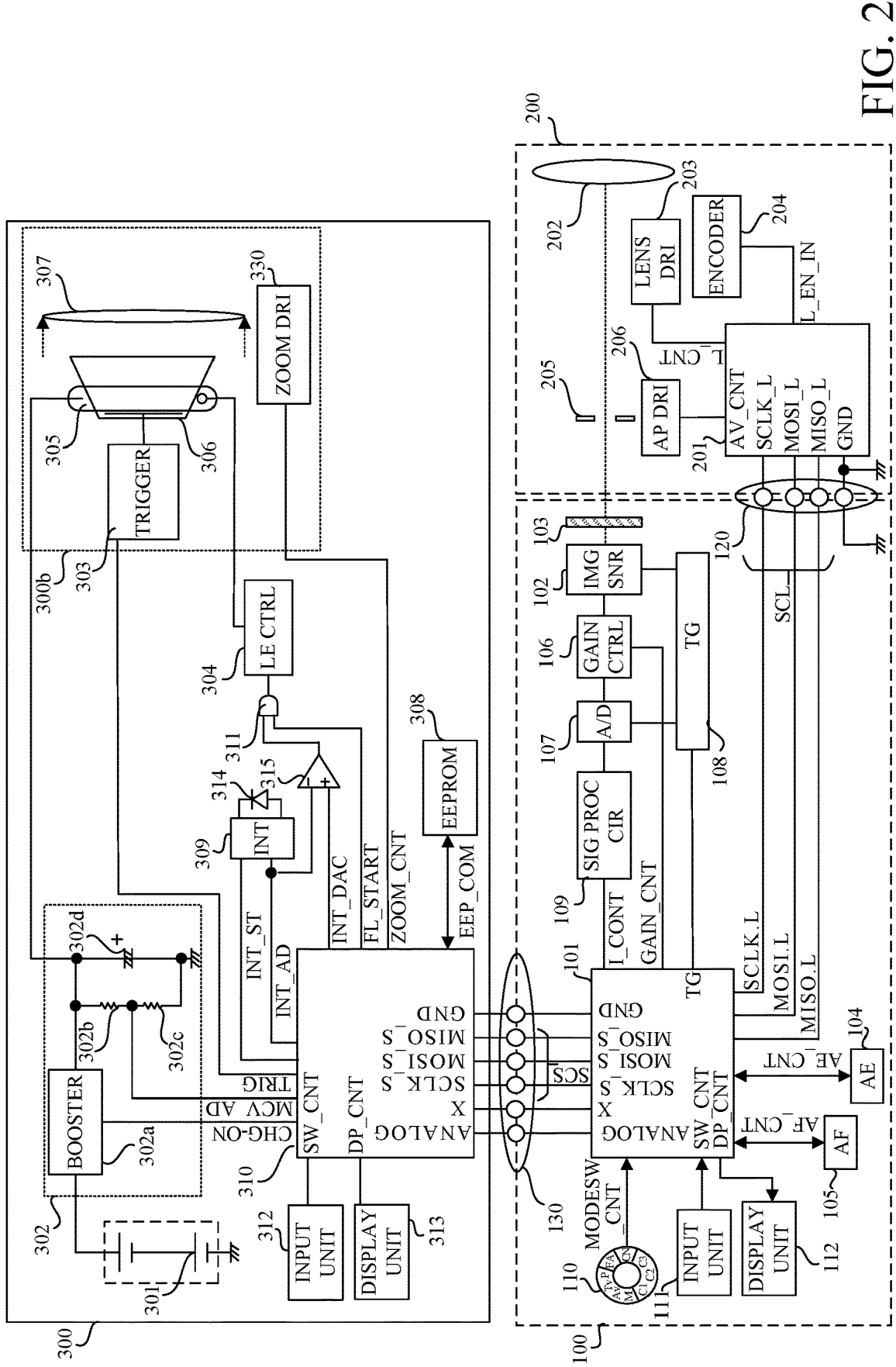
FIG. 2 is a block diagram illustrating the overall configuration of the imaging system.

FIG. 2 illustrates the overall configuration of an imaging system according to a first embodiment. The imaging system includes a camera body 100 as an image pickup apparatus, a lens unit 200 attachable to and detachable from the camera body 100, and a strobe apparatus 300 as an illumination apparatus attachable to and detachable from the camera body 100.

The camera body 100 is a digital single-lens reflex camera with a quick return mirror or a mirrorless camera without a quick return mirror. A microcomputer (referred to as a camera microcomputer hereinafter) 101 provided in the camera body 100 controls the entire imaging system according to a computer program. The camera microcomputer 101 includes a CPU, a ROM, a RAM, an input/output control circuit (I/O control circuit), a multiplexer, a timer circuit, an EEPROM, an A/D converter, a D/A converter, and at least one processor.

An image sensor 102 is a photoelectric conversion element such as a CCD sensor or CMOS sensor, and includes an infrared cut filter, a low-pass filter, and the like. The image sensor 102 photoelectrically converts (images) an object image formed by an imaging optical system, which will be described below.

A shutter 103 is a focal plane shutter and operates between a light shielding state that prevents light from reaching the image sensor 102 and a maximum open position that exposes the image sensor 102.

A photometry (AE) circuit 104 includes a photometry sensor and outputs luminance information for each of a plurality of photometry areas of the imaging area (object). A focus detecting circuit 105 includes an AF sensor, and outputs focus information such as a defocus amount in each of a plurality of focus detecting areas within the imaging area.

A gain control circuit 106 amplifies an analog imaging signal output from the image sensor 102. The amplification gain is controlled by the camera microcomputer 101 according to an imaging condition, user's operation, and the like. An A/D converter 107 converts an amplified analog imaging signal into a digital imaging signal. A timing generator (TG) 108 synchronizes the input timing of the amplified analog imaging signal to the A/D converter 107 with the digital conversion timing by the A/D converter 107. A signal processing circuit 109 performs various signal processing for the digital imaging signal from the A/D converter 107 to generate image data.

A communication line SCL is a signal line that communicably connects the camera body 100 with the lens unit 200 and the strobe apparatus 300. The camera body 100, the lens unit 200, and the strobe apparatus 300 perform communication such as data exchange and command transmission with the camera microcomputer 101 serving as a host through this communication line SCL.

A terminal 120 includes an SCLK_L terminal for synchronizing communication between the camera body 100 and the lens unit 200, a MOSI_L terminal for transmitting data to the lens unit 200, a MISO L terminal for receiving data transmitted from the lens unit 200, and a GND terminal for grounding both the camera body 100 and the lens unit 200.

A terminal 130 includes an SCLK_S terminal for synchronizing communication between the camera body 100 and the strobe apparatus 300, a MOSI_S terminal for transmitting data from the camera body 100 to the strobe apparatus 300, and a MISO S terminal for receiving data transmitted from the strobe apparatus 300. A terminal 130 is a terminal provided on an accessory shoe that enables an accessory device such as the strobe apparatus 300 to be attached to and detached from the camera body 100.

An imaging mode dial 110 is rotated by the user who selects the imaging mode. The imaging mode includes a full auto mode (FA) that automatically sets all settings, a scene mode (CN) suitable for each scene such as a landscape and portrait, a manual setting mode (M), an aperture priority mode (Av), a shutter priority mode (Tv), and a program mode (P).

The imaging mode may be selected among a plurality of custom imaging modes (such as C1, C2, and C3: simply referred to as custom modes hereinafter) in which imaging can be performed under an imaging condition that is arbitrary set by the user through a custom setting. In a plurality of custom modes, different custom settings regarding the light emission of the strobe apparatus 300 may be set through the custom setting.

The custom mode allows the custom settings for the strobe apparatus 300, but the custom settings are not stored in the nonvolatile memory of the camera body 100. This embodiment will refer to custom settings in the camera body 100 as camera custom settings Cx_CA (custom number x=1 to 3) in order to distinguish them from custom settings in the strobe apparatus 300 (strobe custom settings).

The imaging mode may be selected not by the imaging mode dial 110, but by operating another operation member such as a button, a switch, and a touch panel. An input unit 111 includes operating members such as a power switch, a release switch, and a setting button. The camera microcomputer 101 executes various processing according to user input through the input unit 111. SW1 of the release switch is turned on in a case where the user half-presses the release switch, and SW2 of the release switch is turned on in a case where the user fully presses the release switch. The camera microcomputer 101 starts imaging preparation processing such as focusing and photometry when SW1 is turned on, and starts imaging processing such as exposure and development processing when SW2 is turned on. The setting button when operated by the user enables various settings for the strobe apparatus 300 attached to the camera body 100. A display unit 112 including a liquid crystal display device and a light emitting element displays a set imaging mode and other imaging information.

In the lens unit 200, a microcomputer (referred to as a lens microcomputer hereinafter) 201 controls the operation of the lens unit 200 according to a command from the camera microcomputer 101 and a computer program. The lens microcomputer 201 includes a CPU, a ROM, a RAM, an input/output control circuit (I/O control circuit), a multiplexer, a timer circuit, an EEPROM, an A/D converter, a D/A converter, and at least one processor.

The imaging optical system includes a lens 202 such as a focus lens and a zoom lens, and an aperture stop 205, and forms an image of light from an object on the image sensor 102. A lens driving unit 203 includes an actuator for moving the focus lens and its driving circuit. The lens microcomputer 201 causes the lens driving unit 203 to drive the focus lens according to the focus driving amount calculated by the camera microcomputer 101 based on the output of the focus detecting circuit 105. An encoder 204 is provided to detect the position of the focus lens. The lens microcomputer 201 uses the position detected by the encoder 204 to control driving of the focus lens.

The aperture stop 205 adjusts a light amount by changing an aperture diameter. An aperture control unit 206 controls an actuator that changes the aperture diameter of the aperture stop 205. The lens microcomputer 201 causes the aperture control unit 206 to drive the aperture stop 205 according to an F-number (aperture value) instructed by the camera microcomputer 101.

The strobe apparatus 300 emits illumination light such as flashlight or constant light for illuminating the object from a discharge tube 305. In the strobe apparatus 300, a microcomputer (control unit: referred to as a strobe microcomputer hereinafter) 310 performs light emission control of the strobe apparatus 300 according to a command from the camera microcomputer 101 and a computer program. The strobe microcomputer 310 includes a CPU (MPU), ROM, RAM, input/output control circuit (I/O control circuit), multiplexer, timer circuit, EEPROM, A/D converter, D/A converter, and at least one processor.

A battery 301 functions as a power supply (VBAT) for the strobe apparatus 300. A booster circuit block 302 has a booster unit 302a, voltage detection resistors 302b and 302c, and a main capacitor 302d. The booster circuit block 302 boosts the voltage supplied from the battery 301 to several hundred volts by the booster unit 302a, and charges the main capacitor 302d with electrical energy for light emission. The charging voltage of the main capacitor 302d is divided by resistors 302b and 302c, and the divided voltage is input to the A/D conversion terminal of the strobe microcomputer 310.

A trigger circuit 303 applies a pulse voltage to the discharge tube 305 to excite the discharge tube 305. A light emission control circuit 304 controls the start and stop of light emission of the discharge tube 305.

Alight emitting unit 300b of the strobe apparatus 300 includes the discharge tube 305, a reflector 306, and a zoom optical system 307. The discharge tube 305 is excited by receiving a pulse voltage of several kilovolts applied from the trigger circuit 303, and emits illumination light using the electrical energy charged in the main capacitor 302d. The reflector 306 reflects the light emitted from the discharge tube 305 to the side opposite to the object side and guides it to the object side.

The zoom optical system 307 includes an optical panel and the like, and operates to change the irradiation range of the illumination light. By changing the position relative to the discharge tube 305, the zoom optical system 307 can change a guide number according to the change in the irradiation range.

A nonvolatile memory 308 is a memory such as an EEPROM and stores various information about the strobe apparatus 300. The nonvolatile memory 308 also stores data necessary for the light emission control of the strobe apparatus 300, and data of a light emitting mode and a strobe custom setting set by the user, which will be described below. The nonvolatile memory 308 is connected to the strobe microcomputer 310 via an EEP_COM signal.

The input unit 312 includes operation members such as a power switch, a mode setting switch for setting the light emitting mode of the strobe apparatus 300, and a setting button for setting various parameters. The strobe microcomputer 310 executes various processing according to user input through the input unit 312. A display unit 313 including a liquid crystal device and a light emitting element displays information about the strobe apparatus 300.

In a case where the user performs an operation to set or store the light emitting condition through the input unit 312 in the strobe custom setting, the strobe microcomputer 310 stores data of the strobe custom setting in the nonvolatile memory 308. This processing will be described below.

An integration circuit 309 integrates the received light current of a photodiode 314, which will be described below, and inputs the output to an inverting input terminal of a comparator 315 and an A/D converter terminal of the strobe microcomputer 310, which will be described below. A non-inverting input terminal of the comparator 315 is connected to a D/A converter terminal within the strobe microcomputer 310. The output of the comparator 315 is input to one input terminal of an AND gate 311, which will be described below. The other input terminal of the AND gate 311 is connected to a light emission control terminal of the strobe microcomputer 310. The output of AND gate 311 is input to the light emission control circuit 304.

The photodiode 314 is a sensor that receives light emitted from the discharge tube 305 directly or via an optical member such as glass fiber. A zoom driving circuit 330 includes a zoom detector that detects information about the relative positions of the discharge tube 305 and the zoom optical system 307 using an encoder or the like, and a zoom driving unit that includes an actuator for moving the zoom optical system 307. The strobe microcomputer 310 acquires focal length information output from the lens microcomputer 201 via the camera microcomputer 101, and calculates a driving amount of the zoom optical system 307 using the focal length information.

Figure 1:
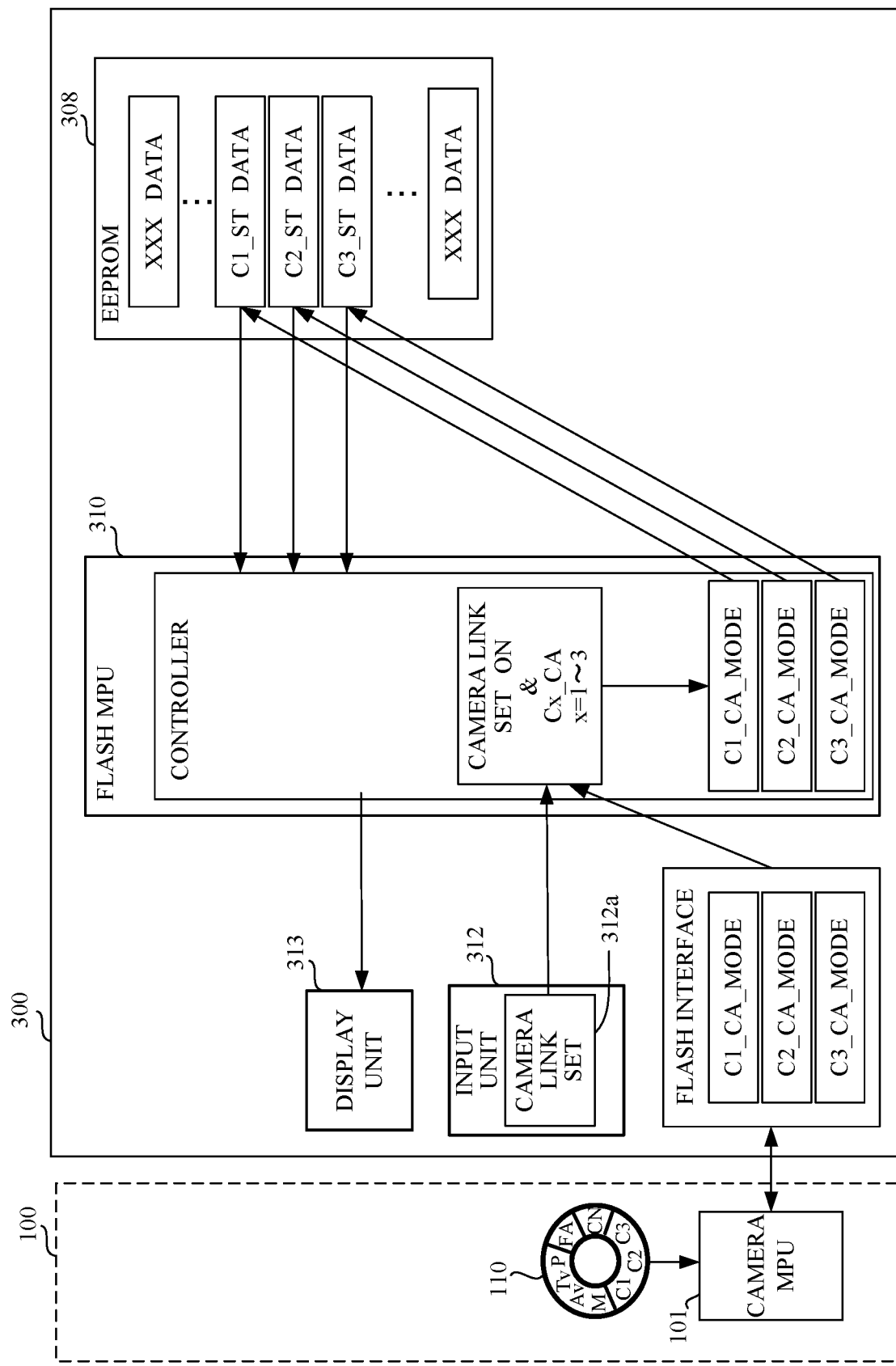
FIG. 1 is a block diagram illustrating part of a configuration of an imaging system including a strobe apparatus according to a first embodiment.
Figure 3:
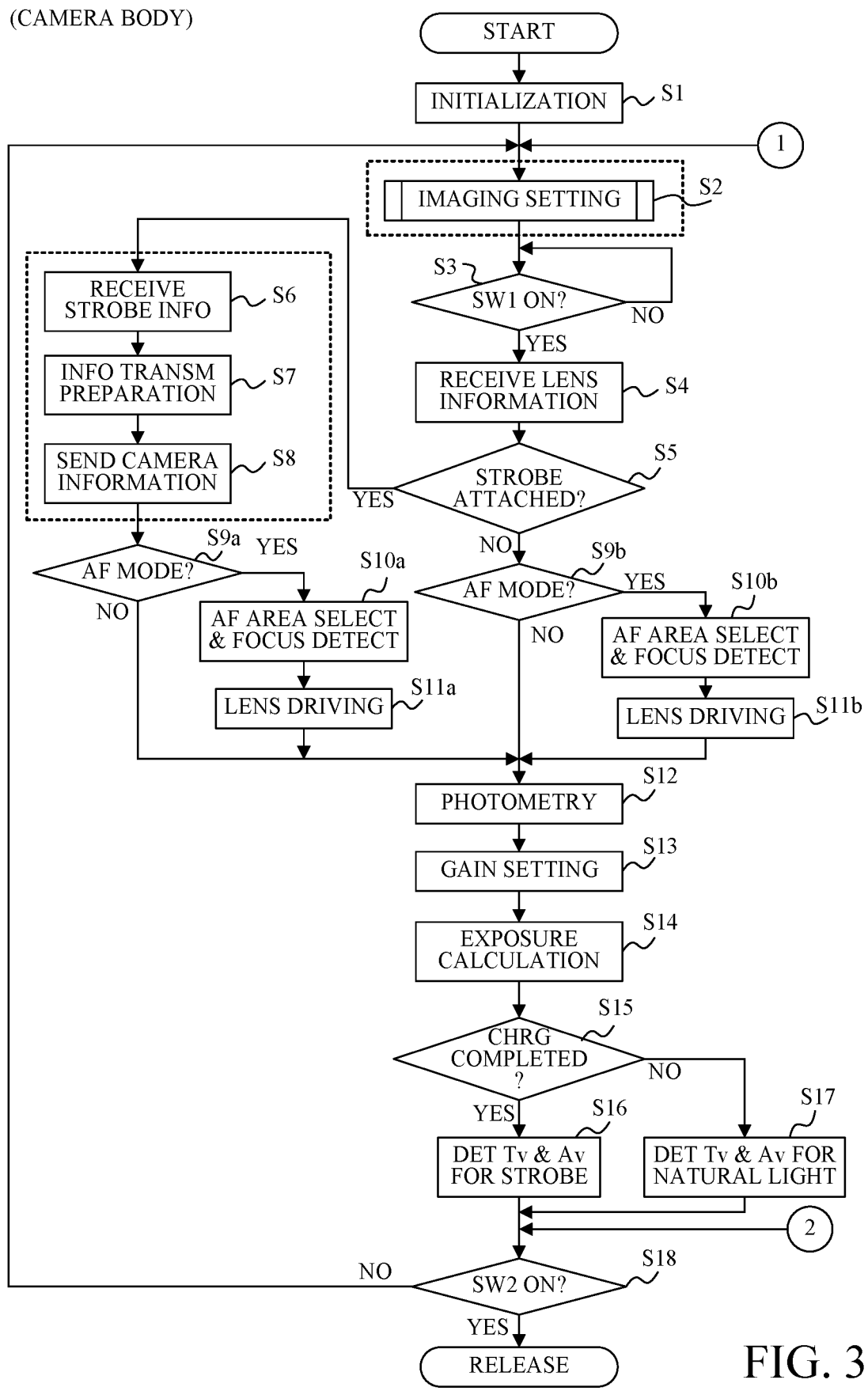
FIG. 3 is a flowchart illustrating pre-release processing executed by a camera body according to a first embodiment.

Referring now to FIGS. 1, 3 to 6, a description will be given of processing executed by the camera body 100 (camera microcomputer 101). FIG. 1 illustrates a part of the configuration of the imaging system illustrated in FIG. 2. A flowchart in FIG. 3 illustrates basic processing executed by the camera microcomputer 101 according to the program.

The camera microcomputer 101 activated by turning on the power switch included in the input unit 111 of the camera body 100 starts this processing. First, in step S1, the camera microcomputer 101 initializes its memory and ports.

Next, in step S2, the camera microcomputer 101 reads the states of the switches included in the input unit 111 of the camera body 100 and preset information, and sets the shutter speed, F-number, and various imaging settings. Details of the processing of this step will be described with reference to the flowchart of FIG. 5.

In step S50, the camera microcomputer 101 reads the imaging mode selected by the imaging mode dial 110. In step S51, the camera microcomputer 101 determines the selected imaging mode. In a case where the selected imaging mode is the full auto mode (FA) or scene mode (CN) as a simple imaging mode, the flow proceeds to step S52 to select imaging mode information indicating the selected imaging mode (FA or CN). Then, in step S53, the imaging mode information is transmitted to the strobe microcomputer 310 via the communication line SCS.

In a case where the selected imaging mode is any of the manual setting mode (M), aperture priority mode (Av), shutter priority mode (Tv), and program mode (P) as applied imaging modes, the flow proceeds to step S54.

In step S54, the camera microcomputer 101 sets imaging mode information indicating the selected imaging mode (M, Av, Tv or P). Then, in step S53, the imaging mode information is transmitted to the strobe microcomputer 310 via the communication line SCS.

In a case where the selected imaging mode is a custom mode (C1, C2 or C3), the flow proceeds to step S55 to set imaging mode information indicating the selected custom mode. Then, in step S53, the imaging mode information is transmitted to the strobe microcomputer 310 via the communication line SCS. As described above, in the custom mode, the strobe setting is not stored in the nonvolatile memory of the camera body 100.

Next, in step S3 of FIG. 3, the camera microcomputer 101 determines whether or not the release switch included in the input unit 111 of the camera body 100 is half-pressed and SW1 is turned on. In a case where SW1 is turned on, the flow proceeds to step S4, and in a case where SW1 is turned off, step S3 is repeated.

In step S4, the camera microcomputer 101 communicates with the lens microcomputer 201 via the communication line SCL to acquire focal length information about the lens unit 200 and optical information necessary for focusing and photometry.

Next, in step S5, the camera microcomputer 101 determines whether or not the strobe apparatus 300 is attached to the camera body 100. In a case where the strobe apparatus 300 is attached to the camera body 100, the flow proceeds to step S6, and in a case where it is not attached, the flow proceeds to step S9b. Whether the strobe apparatus 300 is attached or not is determined by whether or not communication between the camera microcomputer 101 and the strobe microcomputer 310 is being performed. A mechanical switch for detecting the attachment of the strobe apparatus 300 may be provided for the determination.

In step S6, the camera microcomputer 101 communicates with the strobe microcomputer 310 via the communication line SCS. At this time, the camera microcomputer 101 acquires strobe information including ID information about the strobe apparatus 300, charging information indicating the charging state of the main capacitor 302d, and light emission information such as the light emission amount and light emitting mode of the strobe apparatus 300 from the strobe microcomputer 310. The camera microcomputer 101 communicates with the strobe microcomputer 310 via the communication line SCS, and transmits the focal length information acquired in step S4 to the strobe microcomputer 310. Thereby, the strobe microcomputer 310 calculates a driving amount of the zoom optical system 307 based on the received focal length information, and moves the zoom optical system 307 based on the calculated driving amount to change the irradiation range of the strobe apparatus 300 according to the focal length.

Next, in step S7, the camera microcomputer 101 prepares to transmit information (camera information) indicating the camera custom setting set via the input unit 111 of the camera body 100 and the state of the release switch to the strobe microcomputer 310 (converts data into a strobe command).

Next, in step S8, the camera microcomputer 101 transmits the camera information prepared in step S7 to the strobe microcomputer 310.

Next, in step S9a, the camera microcomputer 101 determines whether or not an autofocus (AF) mode is set. In a case where the AF mode is set, the flow proceeds to step S10a, and in a case where the AF mode is not set, that is, in a case where a manual focus (MF) mode is set, the flow proceeds to step S12.

In step S10a, the camera microcomputer 101 causes the focus detecting circuit 105 to perform the focus detection operation using the phase difference detection method.

In step S10a, the camera microcomputer 101 determines a focus detecting area (referred to as a target focusing area hereinafter) to be focused on among a plurality of focus detecting areas based on an automatic selection algorithm such as near point priority or a user's operation to the input unit 111.

Next, in step S11a, the camera microcomputer 101 stores the target focusing area determined in step S10a in the RAM within the camera microcomputer 101.

In step S11a, the camera microcomputer 101 calculates a driving amount of the focus lens based on the focus information from the focus detecting circuit 105. The camera microcomputer 101 communicates with the lens microcomputer 201 via the communication line SCL, and transmits a focus command including the calculated driving amount to the lens microcomputer 201. Thereby, the lens microcomputer 201 moves the focus lens by the received driving amount. Then, the flow proceeds to step S12.

On the other hand, in a case where it is determined in step S5 that the strobe apparatus 300 is not attached, the flow proceeds to step S9b to determine whether the AF mode is set in the same manner as in step S9a. In a case where the AF mode is set, the flow proceeds to step S10b, and in a case where the MF mode is set, the flow proceeds to step S12.

In step S10b, the camera microcomputer 101 determines a target focusing area from a plurality of focus detecting areas, similar to step S10a. Next, in step S11b, the camera microcomputer 101 calculates a driving amount of the focus lens and transmits a focus command including the driving amount to the lens microcomputer 201 to move the focus lens, as in step S11a. Then, the flow proceeds to step S12.

In step S12, the camera microcomputer 101 causes the photometry circuit 104 to perform photometry, and obtains the photometry result from the photometry circuit 104. For example, the camera microcomputer 101 causes the RAM to store a luminance value, which is the photometry result obtained in a predetermined area of the photometry sensor provided in the photometry circuit 104, as the object luminance value EVb.

Next, in step S13, the camera microcomputer 101 and the gain control circuit 106 control the gain according to the ISO speed or the like input from the input unit 111. The camera microcomputer 101 communicates with the strobe microcomputer 310 via the communication line SCS, and transmits gain setting information indicating the controlled gain to the strobe microcomputer 310.

Next, in step S14, the camera microcomputer 101 performs exposure calculation based on the photometry result obtained in step S12 to determine an exposure value.

Next, in step S15, the camera microcomputer 101 determines whether or not a charging completion signal has been received from the strobe microcomputer 310. In a case where the charge completion signal has been received, the flow proceeds to step S16; otherwise, the flow proceeds to step S17.

In step S16, the camera microcomputer 101 determines the shutter speed Tv and the aperture value Av as exposure control values suitable for imaging with light emission of the strobe apparatus 300 (strobe imaging) based on the exposure value calculated in step S14.

On the other hand, in step S17, the camera microcomputer 101 determines an exposure control value suitable for imaging without light emission of the strobe apparatus 300 (non-strobe imaging) based on the exposure value calculated in step S14.

After the exposure control value is determined in step S16 or step S17, the flow proceeds to step S18 to determine whether or not the release switch included in the input unit 111 is fully pressed to turn on SW2. In a case where SW2 is turned on, the flow proceeds to step S19 in FIG. 4, and in a case where SW2 is turned off, the flow returns to step S2.

Figure 4:
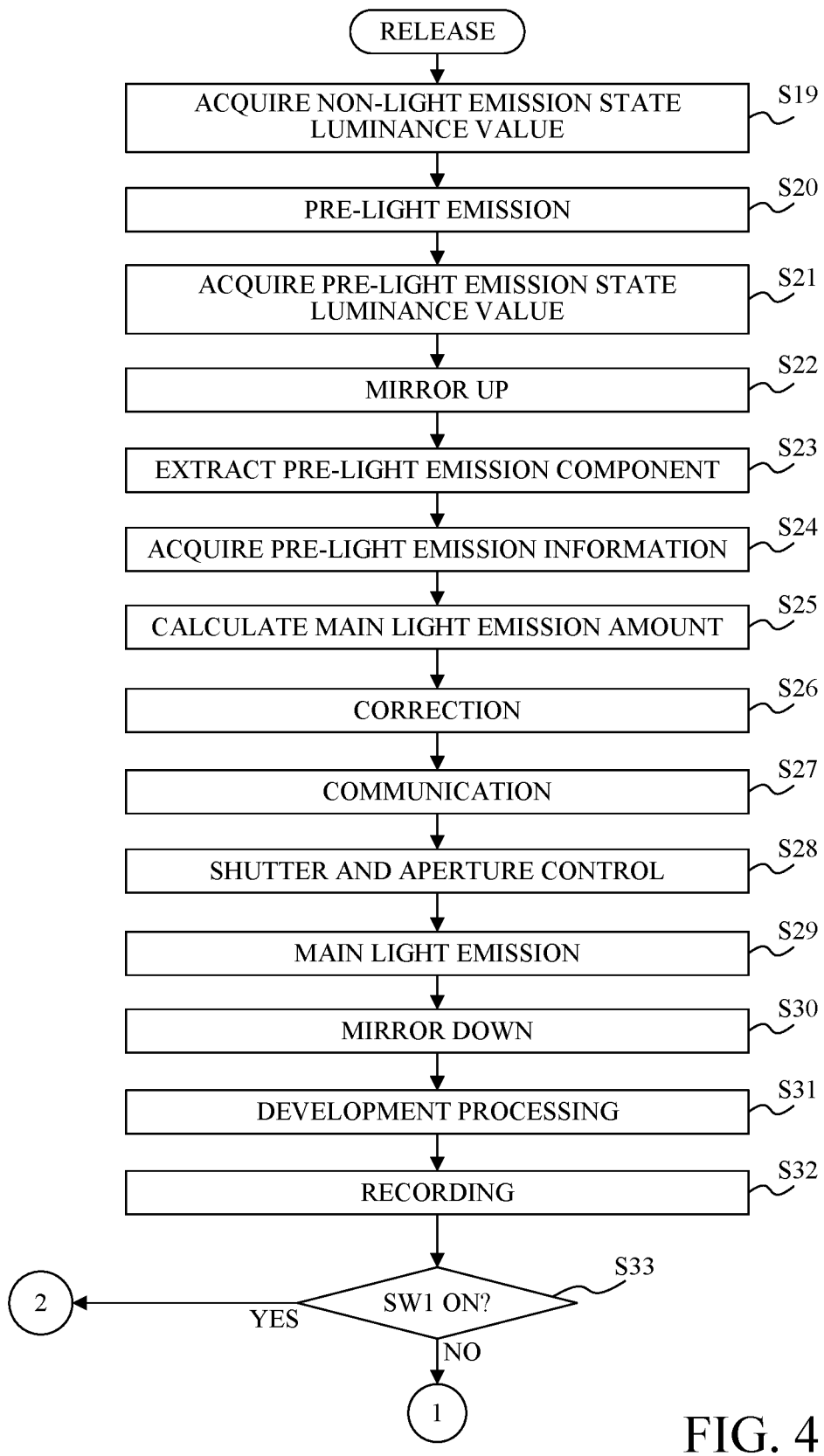
FIG. 4 is a flowchart illustrating release processing executed by the camera body.
Figure 5:
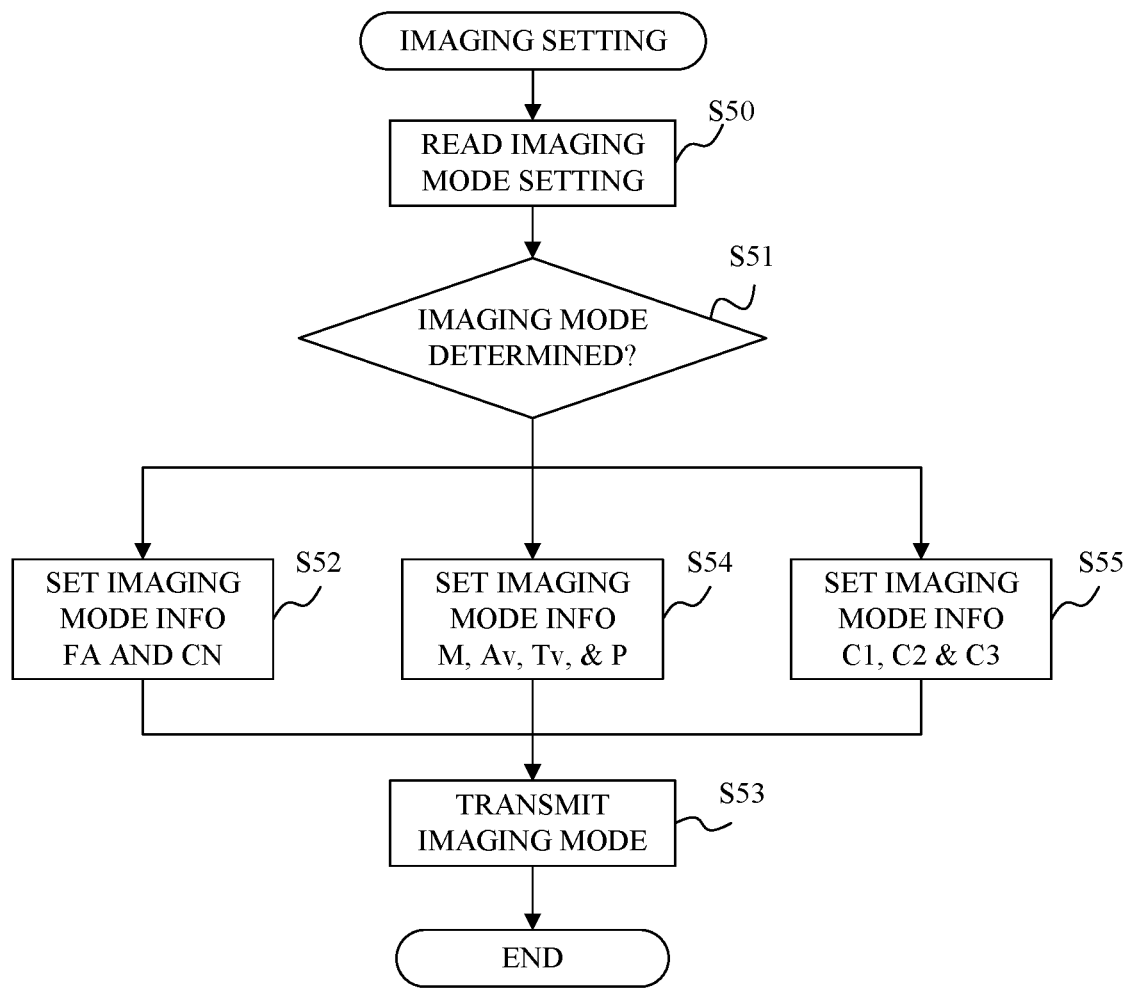
FIG. 5 is a flowchart illustrating camera setting processing executed by the camera body.

The flowchart in FIG. 4 illustrates strobe imaging processing executed by the camera microcomputer 101. In this example, the camera body 100 has a quick return mirror.

In step S19, the camera microcomputer 101 causes the photometry circuit 104 to perform photometry with the strobe apparatus 300 in the non-emission state, and acquires the photometry result in the non-emission state (non-emission state luminance value) from the photometry circuit 104. The camera microcomputer 101 stores the non-emission state luminance value acquired in each photometry area as EVa in the RAM.

Next, in step S20, the camera microcomputer 101 instructs the strobe microcomputer 310 to perform pre-light emission via the communication line SCS. The strobe microcomputer 310 controls the trigger circuit 303 and the light emission control circuit 304 in accordance with this command, and causes the discharge tube 305 to perform pre-light emission with a predetermined light amount.

Next, in step S21, the camera microcomputer 101 causes the photometry circuit 104 to perform photometry while the strobe apparatus 300 is performing the pre-light emission, and the photometry circuit 104 outputs the photometry result in the pre-light emission state (pre-light emission state luminance value). The camera microcomputer 101 stores the acquired pre-light emission state luminance value as EVf in the RAM.

Next, in step S22, the camera microcomputer 101 moves up the quick return mirror and retracts it from the imaging optical path prior to exposure.

Next, in step S23, the camera microcomputer 101 extracts a luminance value EVdf of the pre-light emission component from the non-emission state luminance value and the pre-light emission state luminance value using the following equation:

$$EVdf = LN2(2^{EVf} - 2^{EVa})$$

Next, in step S24, the camera microcomputer 101 acquires pre-light emission information Qpre indicating a light amount emitted during pre-light emission from the strobe microcomputer 310 via the communication line SCS.

Next, in step S25, the camera microcomputer 101 calculates a proper main light emission amount from the target focusing area, focal length information, and pre-light emission information Qpre. In the calculation of the main light emission amount, a proper relative ratio r of the main light emission amount to the pre-light emission amount is obtained based on the exposure value EVs, the object luminance EVb, and the luminance value EVdf of the pre-light emission component.

$$r = LN2(2^{EVs} - 2^{EVb}) - EVdf$$

A difference between the exposure value EVs and the expanded object luminance EVb is obtained to properly control the exposure due to illumination light and external light.

Next, in step 26, the camera microcomputer 101 calculates a post-correction relative ratio r' by correcting the relative ratio r using the following equation, the shutter speed Tv during strobe imaging, the emission time t_pre of the pre-light emission, and the preset correction coefficient c:

$$r' = r + Tv - t\_pre + c$$

The relative ratio r is corrected using the shutter speed Tv and the light emission time t_pre of the pre-light emission to correctly compare the photometric integral value INTp during the pre-light emission and the photometric integral value INTm of the main light emission.

Next, in step S27, the camera microcomputer 101 transmits information on the relative ratio r' for determining the main light emission amount to the strobe microcomputer 310 via the communication line SCS.

Next, in step S28, the camera microcomputer 101 transmits to the lens microcomputer 201 an aperture command including the aperture value Av determined in step S16 of FIG. 3, and controls the shutter 103 according to the determined shutter speed Tv.

Next, in step S29, the camera microcomputer 101 commands the strobe microcomputer 310 to perform the main light emission via the communication line SCS. Thereby, the strobe microcomputer 310 causes the discharge tube 305 to perform the main light emission based on the relative ratio r' transmitted from the camera.

Next, in step S30, the camera microcomputer 101 moves down the quick return mirror and places it in the imaging optical path.

Next, in step S31, the camera microcomputer 101 causes the gain control circuit 106 to amplify the analog imaging signal output from the image sensor 102 with the set gain and then performs development processing that causes the A/D converter 107 to convert the amplified analog imaging signal to a digital imaging signal. The camera microcomputer 101 causes the signal processing circuit 109 to perform signal processing such as white balance for the digital imaging signal to generate image data.

Next, in step S32, the camera microcomputer 101 records the image data in an unillustrated memory and ends the strobe imaging processing.

Thereafter, in step S33, the camera microcomputer 101 determines whether SW1 is turned on, returns to step S18 in a case where SW1 is turned on, and returns to step S2 in a case where SW1 is not turned off.

Figure 6:
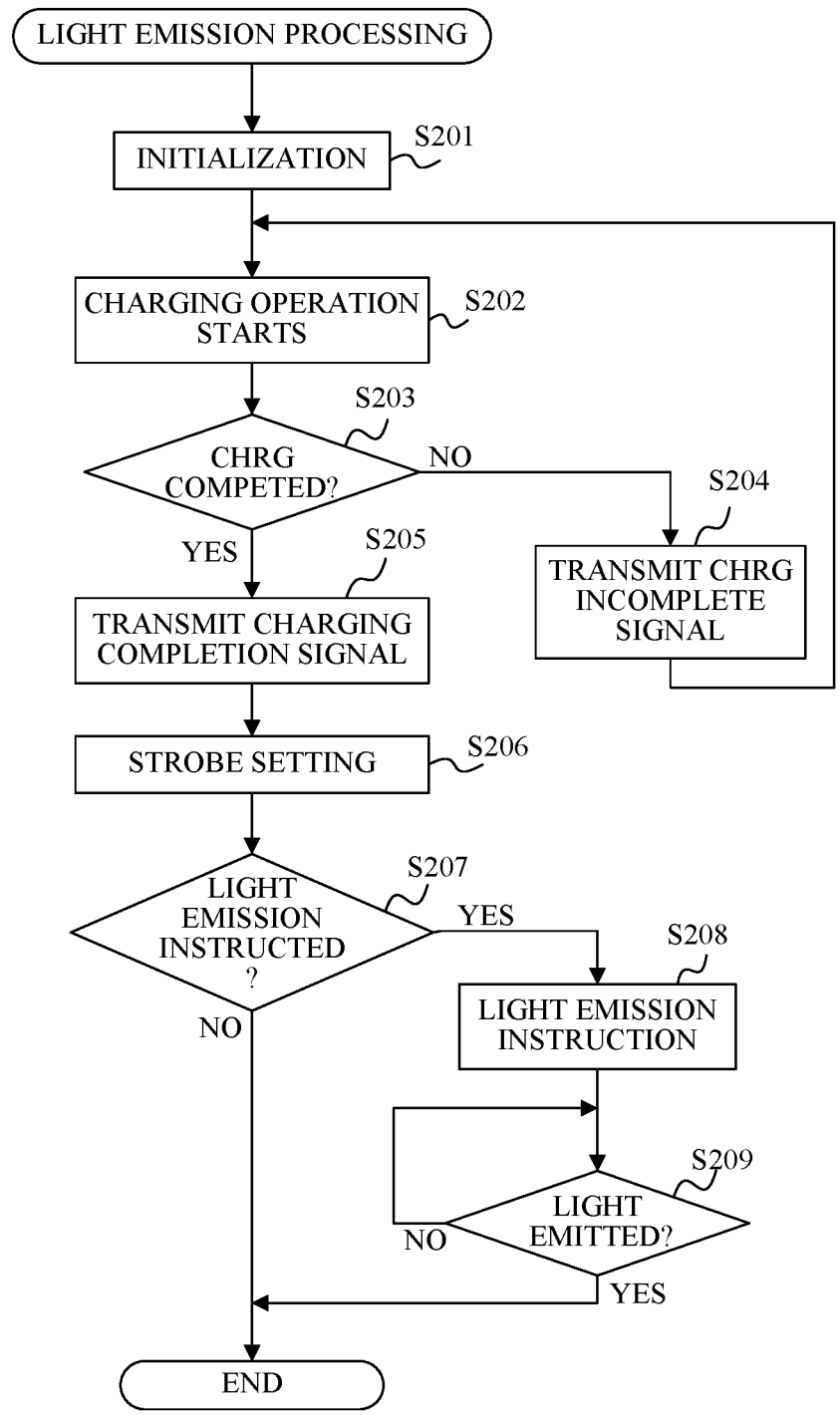
FIG. 6 is a flowchart illustrating a strobe charging and light emitting operation according to the first embodiment.

The flowchart in FIG. 6 illustrates light emission processing executed by the strobe microcomputer 310 according to the computer program. The strobe microcomputer 310 activated by turning on the power switch included in the input unit 312 of the strobe apparatus 300 starts this processing.

In step S201, the strobe microcomputer 310 initializes its memory and ports.

Next, in step S202, the strobe microcomputer 310 causes the booster circuit block 302 to start charging the main capacitor 302d.

Next, in step S203, the strobe microcomputer 310 determines whether charging of the main capacitor 302d is completed, that is, whether the charging voltage is equal to or higher than a predetermined value. In a case where the charging voltage is equal to or higher than the predetermined value, the flow proceeds to step S205, and in a case where the charging voltage is less than the predetermined value, the flow proceeds to step S204.

In step S204, the strobe microcomputer 310 transmits a charging incomplete signal to the camera microcomputer 101. Then, the flow returns to step S202.

In step S205, the strobe microcomputer 310 transmits a charging completion signal to the camera microcomputer 101. Then, the flow proceeds to step S206.

In step S206, the strobe microcomputer 310 performs processing for the imaging mode information transmitted from the camera microcomputer 101. More specifically, the strobe microcomputer 310 determines the imaging mode set in the camera body 100, and sets the light emitting condition for the main light emission (strobe setting) according to the imaging mode. At this time, the strobe microcomputer 310 performs processing for reading data of the strobe custom setting corresponding to the camera custom setting.

Figure 7:
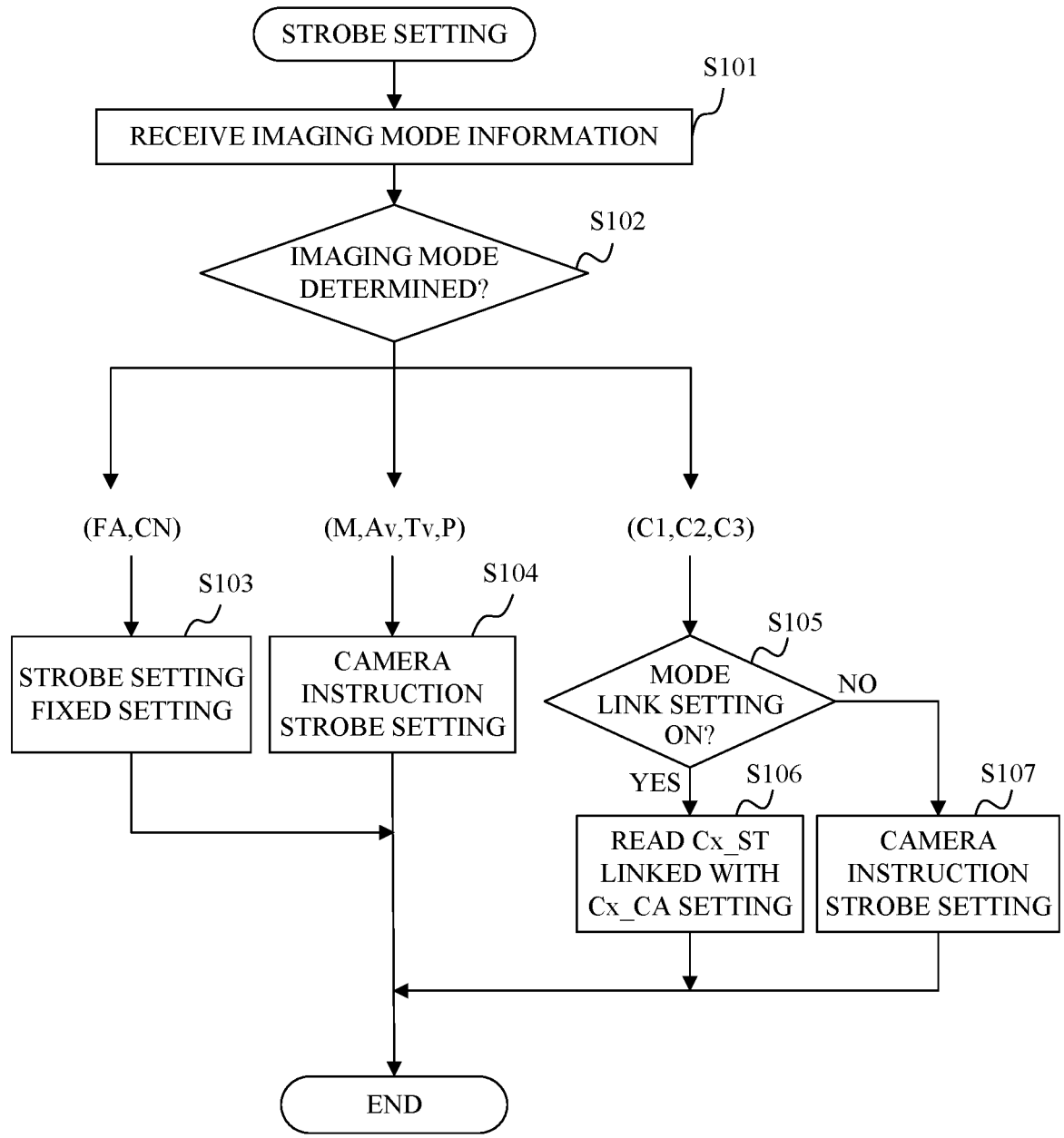
FIG. 7 is a flowchart illustrating processing executed by the strobe apparatus according to the first embodiment.

A flowchart in FIG. 7 illustrates the strobe setting processing in step S206.

In step S101, the strobe microcomputer 310 receives the imaging mode information transmitted from the camera microcomputer 101.

In step S102, the strobe microcomputer 310 determines the received imaging mode. In a case where the imaging mode is a full auto mode (FA) or scene mode (CN), the strobe microcomputer 310 performs a strobe setting (for example, automatic light control setting) fixed as optimum for FA and CN in step S103, and the flow ends.

In a case where the imaging mode is a manual setting mode (M), aperture priority mode (Av), shutter priority mode (Tv), or program mode (P), the flow proceeds to step S104. In step S104, the strobe microcomputer 310 performs strobe setting based on the light emission setting information received from the camera microcomputer 101 together with the imaging mode information, and ends this processing. The light emission setting information includes at least one of, for example, strobe light emission amount information, light emitting mode information, strobe wireless setting information, synchronization mode information, light control correction information, and the like, which will be described below.

In a case where the imaging mode is a custom mode (C1, C2, C3), the flow proceeds to step S105 to determine a mode link setting. The mode link setting is a setting by which the camera custom setting (Cx_CA) of the custom imaging mode and the strobe custom setting (CX_ST) stored in the nonvolatile memory 308 are or are not to be linked (combined). The mode link setting can be turned on and off by the user through a link setting switch (link setting unit) 312a of the input unit 312.

The strobe custom setting is a light emitting condition (custom light emitting condition) of the strobe apparatus 300 set by the custom setting of the user. The light emitting condition includes a light emitting mode such as automatic light control with pre-light emission, manual light emission, multi (continuous) light emission, custom light emission, and external light control, a light control exposure correction value for adjusting a light emission amount, and a synchronization mode, such as high-speed synchronization and rear curtain synchronization.

In a case where the mode link setting is turned on, light emission is performed with the strobe custom setting linked with the camera custom setting in the camera body 100. In a case where the mode link setting is turned off, no light emission is performed by such link.

A plurality of strobe custom settings may be prepared, each of which can be separately set.

As illustrated in FIG. 1, the nonvolatile memory 308 has a plurality of storage areas (registers), and data C1_ST DATA, C2_ST DATA, and C3_ST DATA for the strobe custom setting are stored in separate registers.

In a case where the mode link setting is turned on in step S105, the flow proceeds to step S106 to read from the nonvolatile memory 308 data of the strobe custom setting linked with the camera custom setting. In this way, the light emitting condition of the strobe custom setting linked with the camera custom setting is set before the main light emission.

In a case where the mode link setting is turned off in step S105, the flow proceeds to step S107, the camera custom setting and the strobe custom setting are not linked, and the light emitting condition is set in the custom mode (camera custom setting) received from the camera microcomputer 101. However, the light emitting condition for this camera custom setting is not stored in the nonvolatile memory 308 as the strobe custom setting. Then, this flow ends.

In step S207 of FIG. 6, the strobe microcomputer 310 determines whether or not it has received a light emission instruction (light emission start signal) from the camera microcomputer 101. In a case where the strobe microcomputer 310 determines that it has received the light emission instruction, the flow proceeds to step S208. Then, the flow ends.

In step S208, the strobe microcomputer 310 performs light emission control by instructing the light emission control circuit 304 to emit light according to the strobe setting in S206. Thereby, the light emission control circuit 304 causes the discharge tube 305 to emit light.

Next, in step S209, the strobe microcomputer 310 determines whether or not light has been emitted, and ends this processing in a case where light has been emitted.

This embodiment stores the strobe custom setting corresponding to the camera custom setting in the strobe apparatus 300, and enables the user to easily perform strobe imaging under a desired light emitting condition simply by selecting the camera custom setting on the camera body 100.

This embodiment uses three cameras and strobe custom settings, but the number may be other than three.

Second Embodiment

A second embodiment overwrites (updates) the strobe custom setting on the nonvolatile memory 308 with the camera custom setting changed by the user in the camera body 100 in a case where the mode link setting described in the first embodiment is turned on. The configurations of the camera body 100, the lens unit 200, and the strobe apparatus 300 in this embodiment and the processing described with reference to FIGS. 3 to 7 are common to those in the first embodiment.

Figure 8:
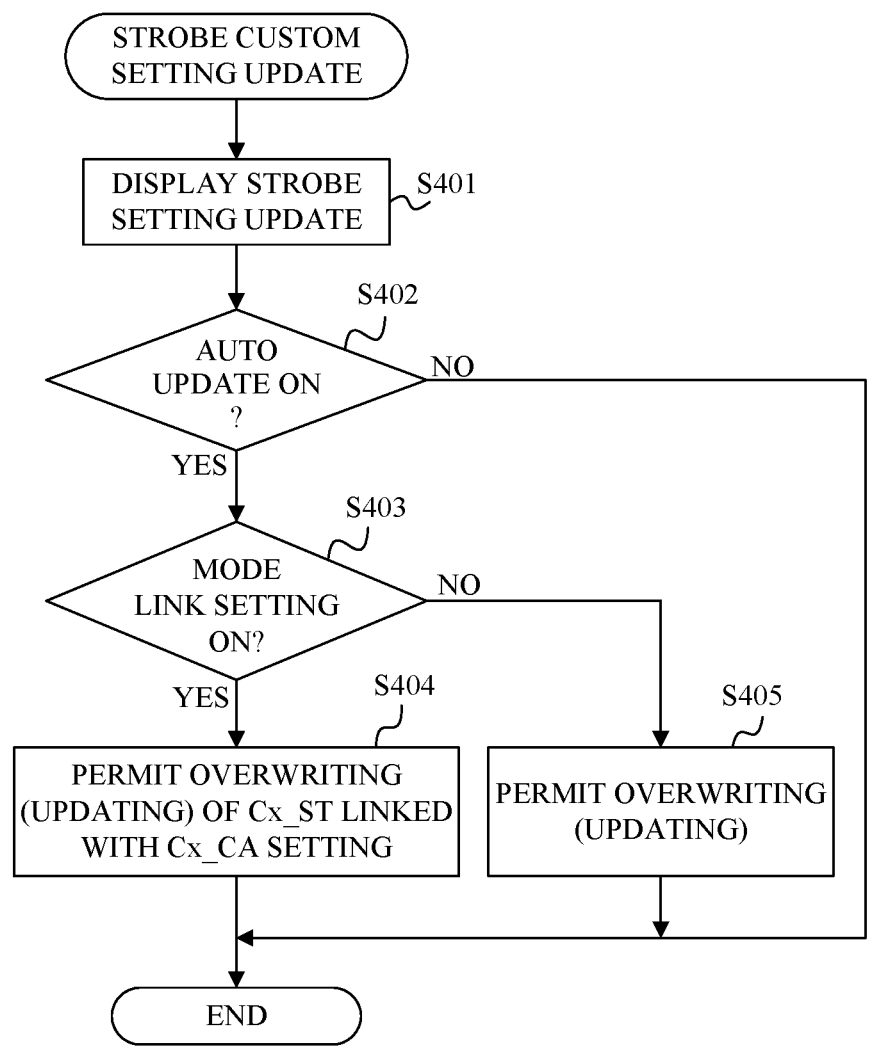
FIG. 8 is a flowchart illustrating processing executed by a strobe apparatus according to a second embodiment.

A flowchart in FIG. 8 illustrates strobe custom setting update processing executed by the strobe microcomputer 310 according to a computer program.

Figure 10A:
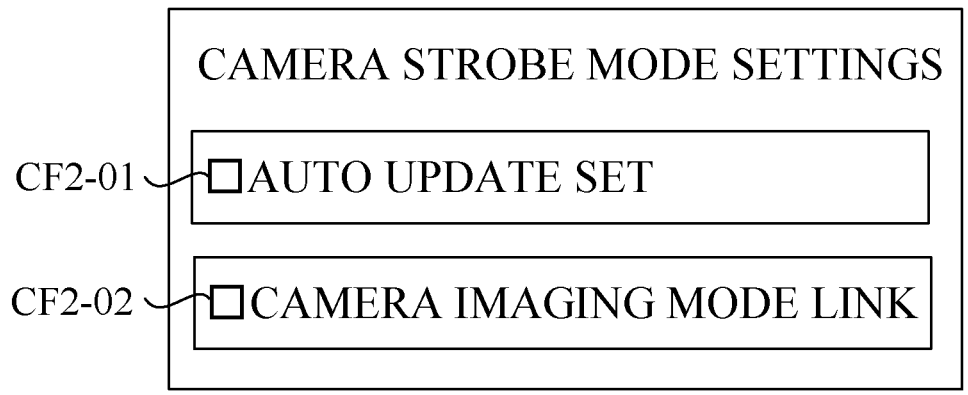
FIGS. 10A and 10B illustrate display examples on a display unit according to the second embodiment.
Figure 10B:
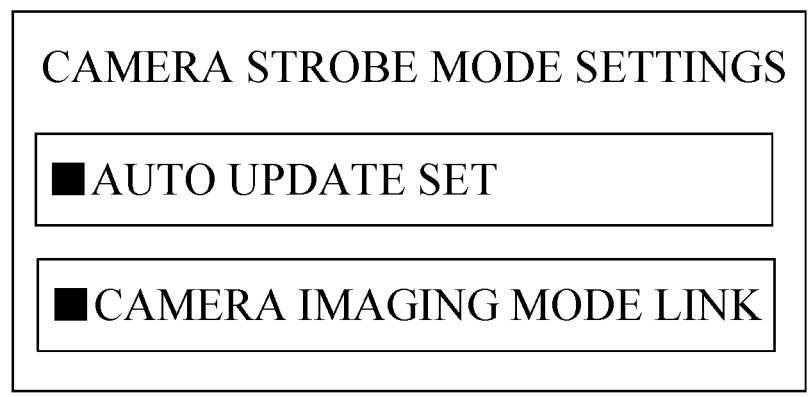

In step S401, the strobe microcomputer 310 causes the display unit 313 to display a strobe custom setting updating menu when the strobe custom setting update is selected by the input unit 312. FIGS. 10A and 10B illustrate examples of menus displayed on the liquid crystal device as the display unit 313. The user updates the strobe custom setting by operating the operation switch of the input unit 312 while viewing this menu.

In FIGS. 10A and 10B, the menu has two check boxes. CF2-01 is a check box for selecting turning on and off of an auto update setting, and CF2-02 is a check box for selecting turning on and off of a mode link setting. A white check box in FIG. 10A indicates turning off, and a black check box in FIG. 10B indicates turning on. A check mark may be displayed instead of a black check box.

Next, in step S402, the strobe microcomputer 310 determines whether or not the auto update setting is turned on. In a case where the auto update setting is turned on, the flow proceeds to step S403, and in a case where the auto update setting is turned off, the flow ends.

In step S403, the strobe microcomputer 310 determines whether or not the mode link setting is turned on. In a case where the mode link setting is turned on, the flow proceeds to step S404, and in a case where the mode link setting is turned off, the flow proceeds to step S405.

In step S404, the strobe microcomputer 310 selects, from the nonvolatile memory 308, a register for the strobe custom setting corresponding to the custom number of the camera custom setting selected by the user. Then, the strobe microcomputer 310 permits the existing strobe custom setting data stored in the selected register to be overwritten with the changed camera custom setting data received from the camera microcomputer 101. Then, this flow ends.

The first embodiment sets the light emitting condition when the strobe microcomputer 310 reads the strobe custom setting linked with the camera custom setting in step S106 of FIG. 7. The second embodiment sets the light emitting condition after the strobe custom setting data is permitted to be overwritten in step S404, overwriting is executed, and the strobe microcomputer 310 reads the updated strobe custom setting data.

In step S405, the strobe microcomputer 310 selects a register for the strobe custom setting corresponding to the custom number selected by the user from the nonvolatile memory 308 without linking the camera custom setting and the strobe custom setting. Then, the strobe microcomputer 310 permits overwriting of the existing strobe custom setting data stored in the register selected by the camera custom setting data received from the camera microcomputer 101. Then, the flow ends.

In the first embodiment, the strobe microcomputer 310 sets the light emitting condition for the camera custom setting that is not linked with the strobe custom setting in step S107 of FIG. 7. In the second embodiment, in a case where overwriting of the strobe custom setting data is permitted in step S405, the strobe custom setting data updated after overwriting is executed is read by the strobe microcomputer 310 and the light emitting condition is set.

Third Embodiment

In a third embodiment, in a case where the mode link setting described in the first embodiment is turned on and the custom mode is selected as the imaging mode, a third embodiment restricts (prohibits) the light emitting condition from changing in the strobe apparatus 300. The configurations of the camera body 100, the lens unit 200, and the strobe apparatus 300 in this embodiment and the processing described with reference to FIGS. 3 to 6 are common to those in the first embodiment.

Figure 9:
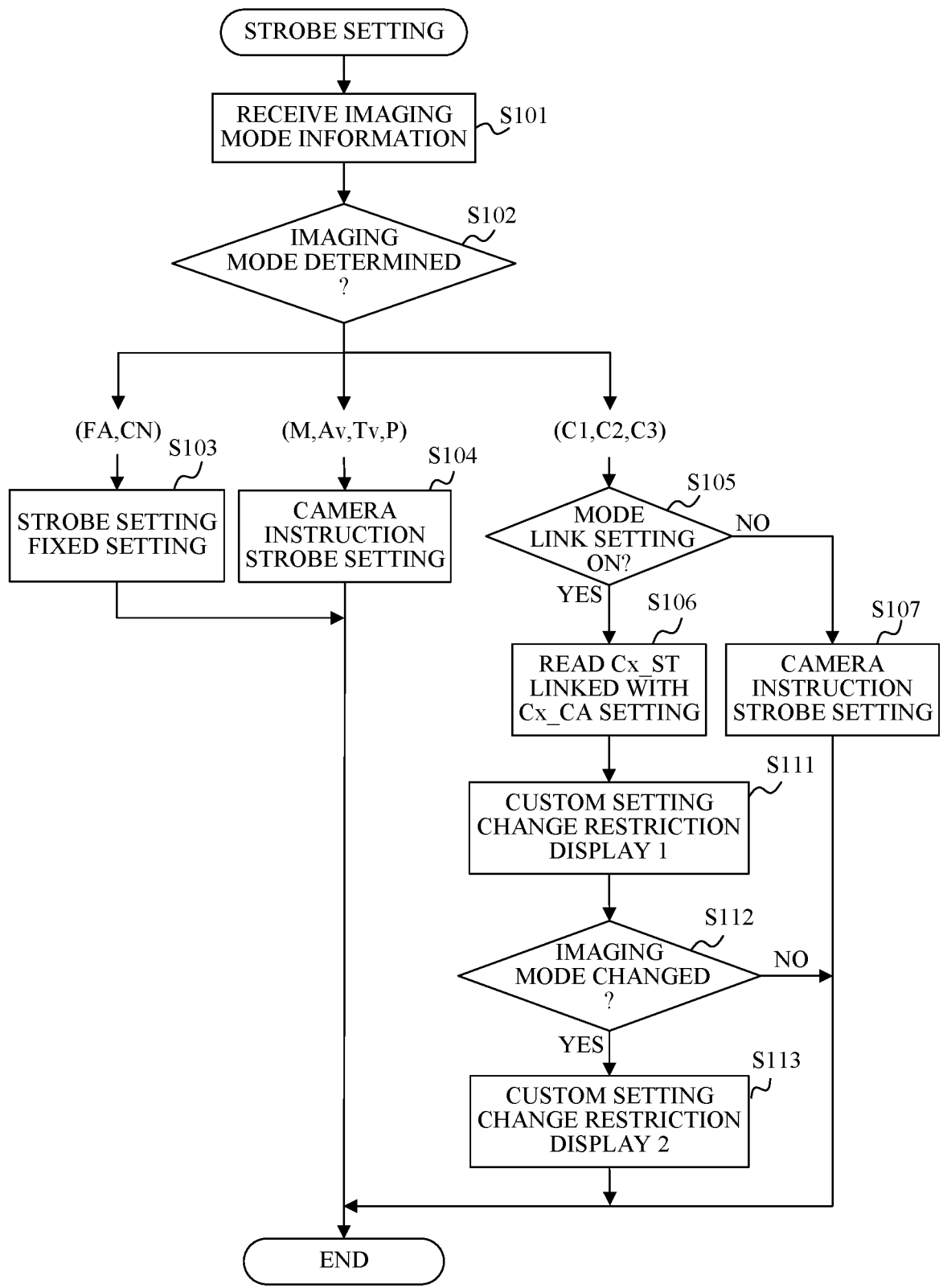
FIG. 9 is a flowchart illustrating processing executed by a strobe apparatus according to a third embodiment.

A flowchart in FIG. 9 illustrates strobe setting processing according to this embodiment. The processing of steps S101 to S107 is similar to that of FIG. 7.

The strobe microcomputer 310, which has proceeded from step S106 to step S111, restricts the light emitting condition (light emitting mode) from changing through the input unit 312 and displays the restriction on the display unit 313.

A description will now be given of a display example of the display unit 313 in a case where the setting of the light emitting condition is not restricted. FIGS. 11A to 11F and 12A to 12H illustrate examples of GUI display on the liquid crystal display device as the display unit 313. The user operates the operation switches of the input unit 312 while viewing the GUI display to set the light emitting condition of the strobe apparatus 300.

Figure 11A:
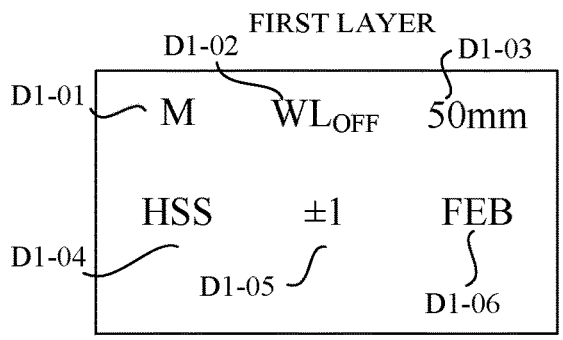
FIGS. 11A to 11F illustrate display examples on the display unit according to the third embodiment.

FIG. 11A illustrates display (first layer) before the setting change. FIGS. 11B to 11E illustrate displays (first and second layers) during the setting change. FIG. 11F illustrates display (first layer) after the setting change.

D1-01 to D1-06 indicate a plurality of (six) display areas on the liquid crystal display device. A white background and black characters are displayed in each display area before and after the setting change. The background and characters may be of other colors.

The light emitting mode is displayed in the display area D1-01. The light emitting mode includes a manual light emission (M), automatic light control with pre-light emission (AUTO), multi-light emission (MULTI), and custom light emission (C1AUTO, C2AUTO, C3AUTO) as described in the first embodiment. Here, C1AUTO, C2AUTO, and C3AUTO indicate that the light emitting mode is set to AUTO in each custom setting of C1, C2, and C3. For example, in a case where the light emitting mode is set to manual light emission in the custom setting of C1, it becomes C1M.

Turning on and off of the wireless mode is displayed in the display area D1-02. A zoom position (focal length) of the zoom optical system 307 is displayed in the display area D1-03. A synchronization mode is displayed in the display area D1-04. The synchronization mode includes high-speed synchronization (HSS) and rear curtain synchronization (not illustrated) as described in the first embodiment.

The display area D1-05 displays a light control correction value (e.g., ±1) for correcting a light amount during the automatic light control. The display area D1-06 displays whether or not a light emission bracket (FEB) for strobe imaging a plurality of times is set while a strobe exposure correction value is shifted.

Figure 11B:
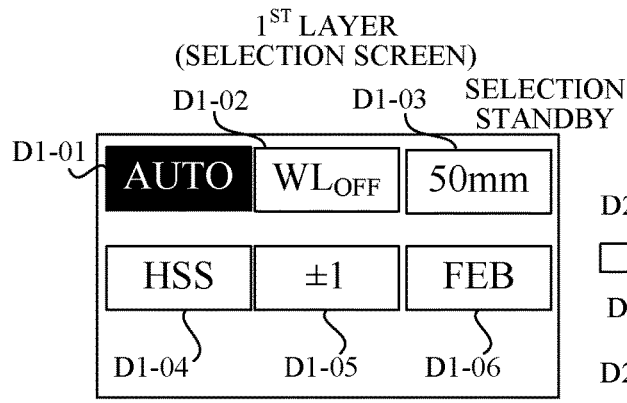

In a case where the user performs an operation to start changing the setting in the state of FIG. 11A, the display of the first layer is changed to the display of the selection standby state as illustrated in FIG. 11B. In this state, each display area is in a box display state surrounded by a black frame. The display area (here D1-11) relating to the setting change is displayed in black and the characters are displayed in white.

Figure 11C:
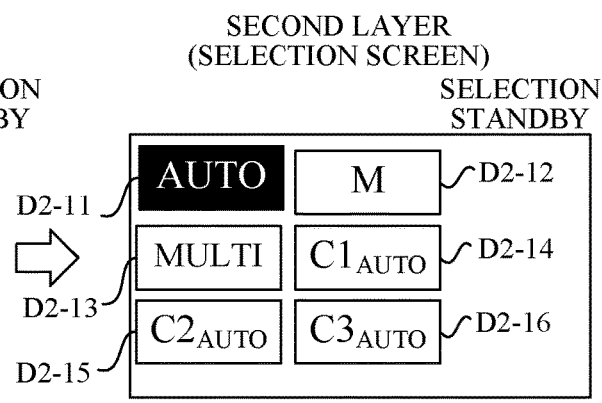

In a case where the user performs an operation to select the light emitting mode in the state of FIG. 11B, the display shifts to the second layer as illustrated in FIG. 11C. Selectable light emitting modes AUTO, M, MULTI, C1AUTO, C2AUTO, and C3AUTO are respectively displayed in six display areas D2-11 to D2-16 in the second layer illustrated in FIG. 11C. In a case where the user selects the desired light emitting mode, for example, selects M as illustrated in FIG. 11D, the display area D2-12 is displayed in black and the characters are displayed in white.

Figure 11E:
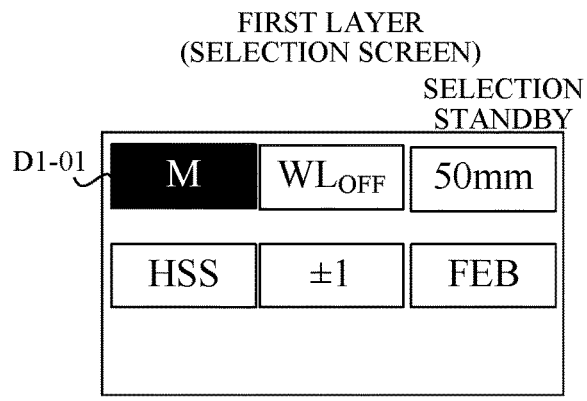
Figure 11D:
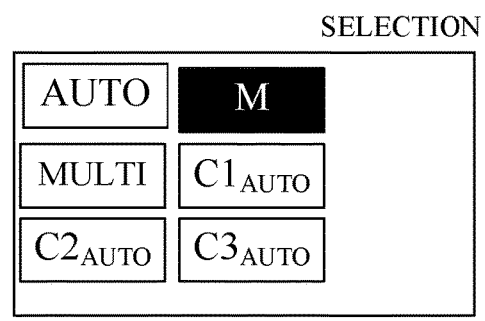
Figure 11F:
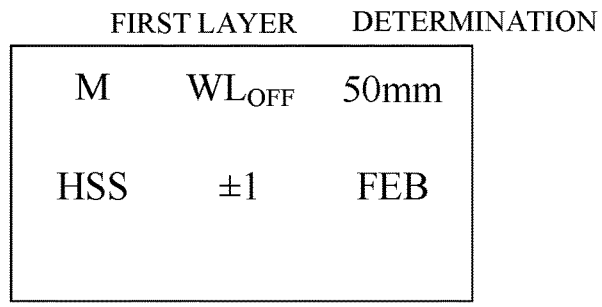

In a case where the user performs an operation to finalize the light emitting mode to M, the display returns to the first layer as illustrated in FIG. 11E. The display area D1-01 in this first layer displays M, which is the selected light emitting mode. At this stage as well, the inside of the display area D1-01 is displayed in black and the letter M is displayed in white. Then, in a case where the user performs an operation to end the setting change, the display of the first layer becomes the display after the setting change (determination) as illustrated in FIG. 11F.

Figure 12A:
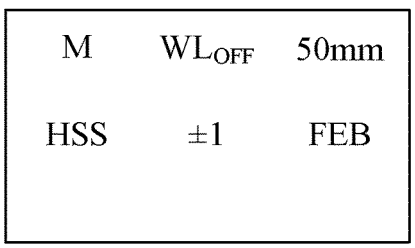
FIGS. 12A to 12H illustrate other display examples of the display unit according to the third embodiment.
Figure 12B:
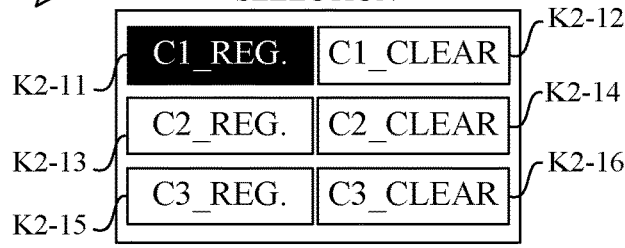

FIG. 12B illustrates display for storing and deleting the strobe custom setting data transitioned from the first layer illustrated in FIGS. 11F and 12A. Display areas K2-11, K2-13, and K2-15 respectively display storage execution of the strobe custom setting data (Cx_REG.). In a case where the user has selected Cx_REG., the corresponding display area is displayed in black and the characters Cx_REG. is displayed in white, and the strobe custom setting data Cx_ST DATA is stored in the corresponding register of the nonvolatile memory 308.

Display areas K2-12, K2-14, and K2-16 each display deleting the strobe custom setting data (CX_CLEAR). In a case where the user selects Cx_CLEAR, the corresponding display area is displayed in black, the characters Cx_CLEAR are displayed in white, and the strobe custom setting data Cx_STDATA is deleted from the corresponding register of the nonvolatile memory 308 and the initial data is stored.

Figure 12C:
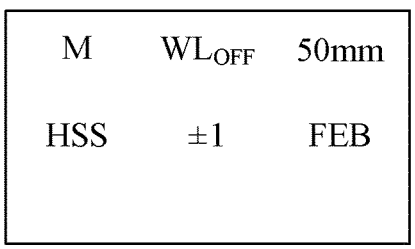

In a case where the user performs an operation to finish storing and deleting the strobe custom setting data, the display returns to the first layer as illustrated in FIG. 12C.

Figure 12D:
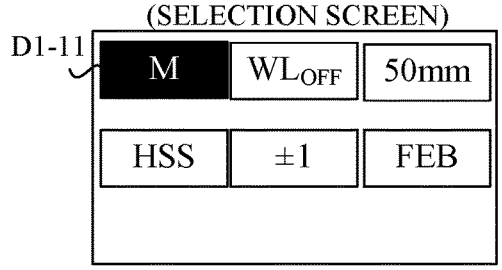
Figure 12E:
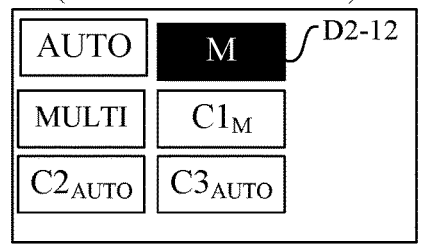

In a case where the user who sets the custom light emitting mode using the stored strobe custom setting data Cx_STDATA performs an operation of selecting the light emitting mode (D1-11) in the first layer illustrated in FIG. 12D, the display transitions from the first layer to the second layer as illustrated in FIG. 12E. Selectable light emitting modes AUTO, M, MULTI, C1M, C2AUTO, and C3AUTO are respectively displayed in the six display areas D2-11 to D2-16 in the second layer. As illustrated in FIG. 12F, in a case where the user selects C1M to be set, the display area D2-12 is displayed in black and the characters C1M are displayed in white.

Figure 12G:
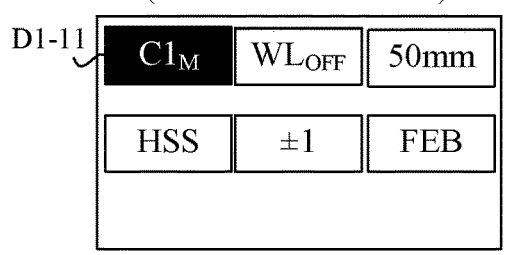
Figure 12F:
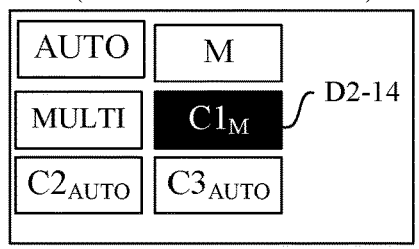
Figure 12H:
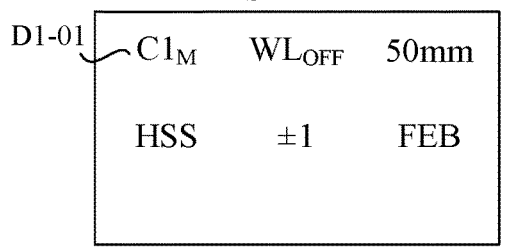

In a case where the user performs an operation to finalize the light emitting mode to C1M, the display returns to the first layer as illustrated in FIG. 12G. The display area D1-11 in this first layer displays C1M, which is the selected light emitting mode. At this stage as well, the inside of the display area D1-11 is displayed in black and the characters are displayed in white. Then, in a case where the user performs an operation to end the setting change, the display of the first layer becomes the display after the setting change as illustrated in FIG. 12H. The display is changed to C1M in the D2-14 area of FIG. 12F by the GUI operation, and returns to the first layer as illustrated in FIG. 12G after the CUI operation selects and finalizes the display.

As illustrated in D1-11 of FIG. 12G, the display of the first layer is C1M, and changed from the setting change state to a final setting state as illustrated in FIG. 12H when the setting is finalized by the above GUI operation.

Figure 13A:
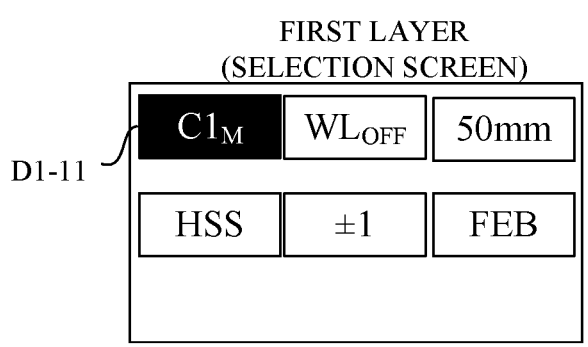
FIGS. 13A to 13D illustrate still another display example of the display unit according to the third embodiment.
Figure 13B:
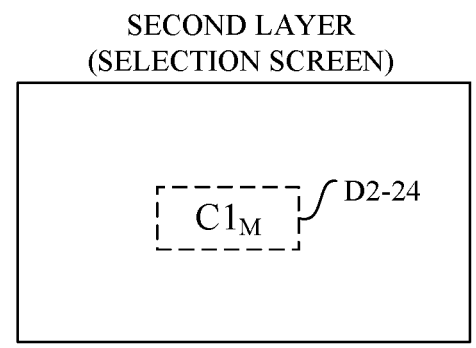

FIGS. 13A and 13B illustrate display examples of the display unit 313 in restricting the setting of the light emitting condition in step S111. A description will now be given of a restriction of changing from C1M to another light emitting mode.

As illustrated in FIG. 12H, in a case where the user performs an operation to change the light emitting mode from the state where C1M is set as the light emitting mode, the display of the first layer becomes the display of the selection standby state as illustrated in FIG. 13A. In this state, each display area is in a box display state surrounded by a black frame. The display area relating to the setting change (D1-11 in this case) is displayed in black, and the characters C1M are displayed in white.

Figure 13C:
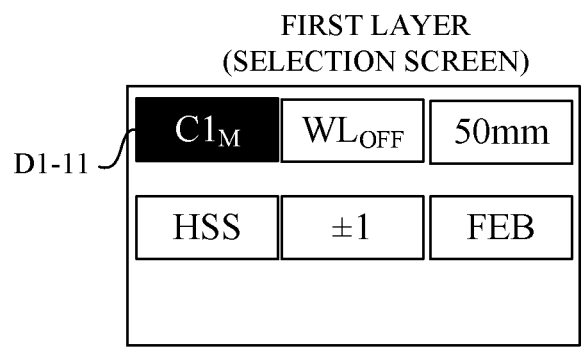

In a case where the user performs an operation to select the light emitting mode in the state of FIG. 13A, the display shifts to the second layer as illustrated in FIG. 13C. At this time, the second layer displays C1M, which is the current emission mode, in the display area D2-24 with a broken frame surrounding it, but another emission mode is not displayed. Thereby, the user is informed by the display that changing from C1M to another light emission mode is restricted.

The strobe microcomputer 310 moving from step S111 to step S112 in FIG. 9 determines whether or not the imaging mode has been changed in the camera body 100 as in step S102. For example, the strobe apparatus 300 determines whether or not the imaging mode of the camera body 100 has been changed from the custom mode to another imaging mode such as an aperture priority mode while the custom light emitting mode is maintained. In a case where the imaging mode is changed, the flow proceeds to step S113, and in a case where the imaging mode is not changed, this flow ends.

In step S113, the strobe microcomputer 310 restricts the custom light emitting mode from changing to another custom mode through the input unit 312 and displays the restriction on the display unit 313. For example, as illustrated in FIG. 12H, in a case where C1M is set as the light emitting mode and the user performs an operation to change the light emitting mode, the display of the first layer becomes the display of the selection standby state. The display in this state is the same as in FIG. 13A.

Figure 13D:
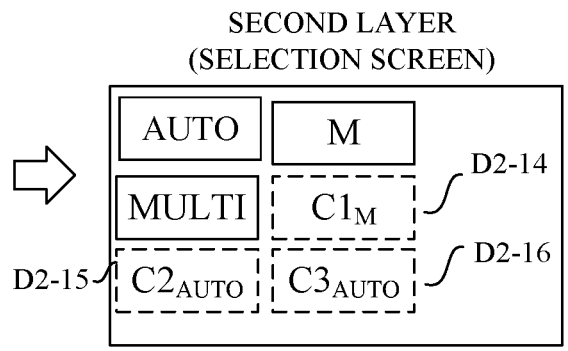

In a case where the user performs an operation to select the light emitting mode in the state of FIG. 13C, the display is changed to the second layer as illustrated in FIG. 13D. At this time, changeable light emitting modes AUTO, M, and MULTI are displayed together with black frames in the display areas D2-11 to D2-13 of the second layer. However, in the display areas D2-14 to D2-16, the current custom light emitting mode C1M and other custom light emitting modes C2AUTO and C3AUTO are displayed together with broken frames. Thereby, the user is informed by the display that changing to the custom light emitting mode is restricted while changing to a light emitting mode other than the custom light emitting mode is permitted.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each embodiment can easily set a custom light emitting condition for an illumination apparatus.

This application claims the benefit of Japanese Patent Application No. 2022-169301, filed on Oct. 21, 2022, which is hereby incorporated by reference herein in its entirety.

What is claimed is:

1. An illumination apparatus communicatively connected to an image pickup apparatus and configured to emit illumination light, the illumination apparatus comprising:
   a memory storing a custom light emitting condition set by a user; and
   at least one processor configured to perform operations of:
      controlling light emission of the illumination light under the custom light emitting condition by reading the custom light emitting condition corresponding to a custom imaging condition from the memory in a case where imaging under the custom imaging condition set by the user is selected in the image pickup apparatus;

making a setting by which the custom imaging condition and the custom light emitting condition are or are not to be linked, wherein the at least one processor restricts a change in the custom light emitting condition in a case where the at least one processor makes the setting by which the custom imaging condition and the custom light emitting condition are to be linked.

2. The illumination apparatus according to claim 1, wherein the at least one processor performs the light emission control by reading the custom light emitting condition corresponding to the custom imaging condition from the memory in a case where the at least one processor makes the setting by which the custom imaging condition and the custom light emitting condition are to be linked.

3. The illumination apparatus according to claim 1, wherein the memory stores a plurality of light emitting conditions different from each other as the custom light emitting condition, and wherein the at least one processor performs the light emitting control by reading from the memory the custom light emitting condition corresponding to the custom imaging condition for imaging selected by the user among plural imaging to which custom imaging conditions different from each other are set in the image pickup apparatus.

4. The illumination apparatus according to claim 1, wherein in a case where imaging having a custom imaging condition including a light emitting condition changed by the user is selected in the image pickup apparatus, the at least one processor updates the custom light emitting condition stored in the memory with a changed light emitting condition.

5. The illumination apparatus according to claim 4, wherein the at least one processor updates the custom light emitting condition stored in the memory with a changed light emitting condition in a case where the at least one processor makes the setting by which the custom imaging condition and the custom light emitting condition are to be linked.

6. An imaging system comprising:
the illumination apparatus according to claim 1; and
an image pickup apparatus.

7. A control method of an illumination apparatus communicatively connected to an image pickup apparatus and configured to emit illumination light, the control method comprising the steps of:

storing a custom light emitting condition set by a user in a memory;

performing light emission control of the illumination light under the custom light emitting condition by reading the custom light emitting condition corresponding to a custom imaging condition from the memory in a case where imaging under the custom imaging condition set by the user is selected in the image pickup apparatus; and making a setting by which the custom imaging condition and the custom light emitting condition are or are not to be linked, wherein a change in the custom light emitting condition is restricted, in a case of making the setting by which the custom imaging condition and the custom light emitting condition are to be linked.

8. A non-transitory computer-readable storage medium storing a program that causes a computer to execute the control method according to claim 7.

* * * * *